Patented Nov. 8, 1938

2,136,176

UNITED STATES PATENT OFFICE 2,136,176

PHOTOENGRAVING

John M. Hammond, Washington, D. C., assignor to The Varnish Products Company, Cleveland, Ohio, a corporation of Ohio No Drawing. Application October 30, 1937, Serial No. 172,054

9 Claims. (Cl. 41—33)

This invention relates to the art of photoengraving and more particularly to what is known in the photoengraving industry as "stripping" and to a new and improved stripping method and a solution by means of which the method of stripping may be effected.

In the photoengraving process a photographic negative is produced. This negative comprises a sensitized nitrocellulose film, which is supported on a suitable support such as a glass plate. After the negative has been developed it becomes necessary, because of the requirements of the printing industry, to reverse this image from left to right. Therefore, it becomes essential to remove this image-bearing film of nitrocellulose from the glass plate and to place it upon another supporting plate, usually of glass, in a reverse position. This operation of removing the image-bearing film from the glass plate is known in the photoengraving art as "stripping."

The film of nitrocellulose is an extremely delicate one and does not of itself have sufficient strength to withstand the operation of stripping. For this reason the practice in the craft has been to coat the film of nitrocellulose with a reinforcing medium or layer of a character which will give it the necessary strength to withstand handling.

For a number of years in the early days of photoengraving stripping was effected by coating a nitrocellulose film with a thick aqueous solution of gelatin. This method consists of pouring the gelatin solution onto the image-bearing surface of the nitrocellulose film adherent to the glass plate, while the plate is on a "leveling stand", supporting the plate on the leveling stand until the water has evaporated from the gelatin, thereby forming a layer or film of dry gelatin over and in contact with the nitrocellulose film, and after the gelatin has dried, stripping the combined nitrocellulose and gelatin film from the glass by immersing the negative in a simple acetic acid solution. The film of nitrocellulose is insoluble in water so that the water of the gelatin solution has no effect on the nitrocellulose film.

A disadvantage of the method just described is that it requires a considerable period of time for the water to evaporate from the gelatin solution and the plate has to be kept perfectly level until the gelatin solution has lost its liquid character. Further disadvantages of the method utilizing the gelatin solution are that: it is difficult to make a proper solution of the jelly-like mass; the jelly-like mass formed by the dissolved gelatin greatly retards evaporation of the solvent regardless of the solvent used; the negative has to be stripped with extreme care to prevent tearing of the image-bearing film and distortion of the image by stretching; the composite film has to be placed on the second support very carefully so that it will not stretch or become distorted; it is difficult to make the composite film adherent to the second support without tearing; the method also necessitates a large amount of storage space wherein the plates can be stored in leveled condition during the drying of the gelatin; the gelatin deteriorates very rapidly when it is subjected to atmospheric conditions, fungi or bacteria, and if it is first prepared by a manufacturer, it is necessary to use extreme care and a container with a type of special lining for maintaining it in its original useful condition until it reaches the hand of its consumer; and the film formed does not have the necessary properties of hardness, tensile strength, and flexibility to prevent distortion and tearing under the usual conditions of present day photoengraving practice. Because of the disadvantages inherent in the gelatin method of stripping, it was proposed that, instead of gelatin, the reinforcing layer also be formed of nitrocellulose. Since a solvent for nitrocellulose would attack the original film, it was not possible to apply the second layer of nitrocellulose directly to the image-bearing film. Due to these difficulties, a stripping method was developed which included the steps of first coating the negative with a solution of India rubber in benzol, permitting evaporation of the benzol so as to leave a protective cover or coating of rubber over the image-bearing nitrocellulose film, then forming a nitrocellulose film on the rubber coating by applying over the rubber coating a nitrocellulose solution.

This method is much more satisfactory and speedy than the earlier method using gelatin, but it has certain disadvantages, particularly in that two coating operations are required to strip the image-bearing film.

One of the principal objects of the present invention is to provide a stripping solution and method of stripping whereby the disadvantages of both of the previous methods are eliminated and the stripping operation is effected more quickly and with a single coating operation, and certain steps which are necessary in the prior methods are eliminated.

An equally important object is to provide a method of stripping an image-bearing negative photographic film, which method includes the steps of applying, directly on the image-bearing film, a film forming solution capable of depositing, by simple evaporation, a dry, hard, tough, transparent stripping film of adequate tensile strength and flexibility to permit handling under the usual conditions of work prevailing in present-day photoengraving practice, and the solvents of which are not solvents of and do not deleteriously affect the image-bearing film.

Another object is to provide a method whereby the removal of the negative image-bearing film from the original supporting plate may be effected by the use of water, and, if desired, without the presence of acetic acid, so that the composite film, after being stripped, is remarkably free from stretching, shrinking, and tearing.

A correlative object is to provide a method of transferring an image-bearing negative photographic film from its original plate to another plate and which comprises applying to the image-bearing surface of the photographic film a solution of cellulose derivative which is soluble in and dissolved in hydrocarbon solvent or solvents which do not deleteriously affect the underlying image-bearing film and which may be evaporated for depositing the cellulose derivative as a film on the image-bearing surface, and stripping the resultant composite film from the original plate and depositing the same onto another supporting plate.

Another object is to provide a composition for carrying out the present method and which stripping composition comprising a cellulose derivative soluble in and dissolved in evaporable hydrocarbon, and like solvents which are not solvents of the nitrocellulose image-bearing film.

Additional objects are to provide a solution for the purposes described and which is capable of forming a tough, flexible and transparent stripping film and which is not dangerously explosive or inflammable.

Other objects and advantages will become apparent from the following specification, wherein exemplary embodiments of the invention are disclosed in detail for purposes of illustration only and not in limitation of the invention.

According to a preferred embodiment of the present invention, the stripping solution comprises a solute which may be one of the modern ethers of cellulose for example, ethylcellulose or an ester of cellulose, such as a product marketed commercially under the trade name "Hercose C", by the Hercules Powder Company of Wilmington, Delaware, and which is a cellulose aceto-butyrate, and a solvent which may be a hydrocarbon solvent, for example, ethylene dichloride or xylol or any other suitable solvent which does not deleteriously affect the image-bearing film. A solution of the foregoing character is applied directly to the image-bearing surface of the image-bearing film. Since the solvent does not dissolve or attack the image-bearing film, it is unnecessary to use any protective layer of India rubber or other protective material.

Where extremely quick drying is desired ethylene dichloride is preferred as a solvent as it evaporates from the stripping solution very rapidly.

Where slower evaporation is desired, the xylol or some other solvent which does not deleteriously affect the image-bearing film and which evaporates less rapidly is used. For example, xylol is desirable in warm humid weather because the lowering of temperature which would be caused by the rapid evaporation of ethylene dichloride under such conditions would be apt to cause precipitation of water upon the film. This effect is called "fogging" and impairs the transparency of the film.

When the image-bearing nitrocellulose film has been coated with the cellulose solution and the solvent has evaporated, the image-bearing film can be stripped from the glass either by immersing it in water or in a weak aqueous solution of acetic acid. In some cases it may be desirable to combine a small amount of acetic acid with the stripping solution to facilitate the stripping of the film in plain water. It is not necessary, however, that acid be used at all.

Under some circumstances the stripping solution may have a dye substance incorporated therein to render the resulting film opaque to actinic light. The photoengraver, by the use of a proper solvent, may dissolve and remove a desired portion or area of the reinforcing or stripping film, leaving the undissolved portion of the stripping film intact so that in subsequent operations only that area of the resultant combined or composite film which is transparent to actinic light will be reproduced. Instead of the dye-carrying stripping film being dissolved from the image-bearing nitrocellulose film, it may be removed by other methods known to the photoengraving industry.

The invention provides a stripping solution and a method of stripping in which the operation of stripping can be effected without requiring the use of India rubber or any other protective layer between the nitrocellulose image-bearing film and the stripping film. At the same time the solvent or vehicle of the stripping solution evaporates much more rapidly than water.

The present invention eliminates the difficulties which are inherent in the prior methods and the solutions which have heretofore been employed and provides a stripping film which has the required degree of toughness, hardness, flexibility, adherence, freedom from distortion of the image upon drying, and durability for use under present-day photoengraving practice.

While I have specifically described certain solutions suitable for carrying out my method, it will be understood that the invention contemplates the use of the recognized equivalents therefore.

I claim:

1. The method of stripping an image-carrying nitrocellulose film from a glass plate which comprises coating the film directly with an ester of cellulose in a volatile solvent to which nitrocellulose is inert, drying the same and then removing the composite film so produced by immersing the plate in water.

2. The method of stripping an image-carrying nitrocellulose film from a glass plate which comprises coating the nitrocellulose film directly with a solution of an ester of cellulose and a solvent for such ester to which nitrocellulose is inert, drying the same and thereafter removing the composite film by immersing the plate in water.

3. The method of stripping a photographic negative having an underlying image-bearing film of nitrocellulose compound which is superimposed upon and adherent to a plate, which comprises in applying directly on the surface of the image-bearing nitrocellulose compound film, a film forming solution of a solute of essentially water-insoluble material and an evaporable solvent which does not affect the nitrocellulose film and image, and capable of depositing on the nitrocellulose compound film without detrimentally affecting the nitrocellulose compound film and image, by evaporation of the solvent, an adherent, translucent film of adequate tensile strength and flexibility to permit handling under the usual conditions of photoengraving work, effecting evaporation of the solvent, and stripping from the plate, the combined solute film and nitrocellulose compound image-bearing film.

4. The method of stripping a photographic negative having an image-bearing layer of nitrocellulose which is superimposed upon a plate which comprises applying directly on the surface of the negative a coating of solution essentially of cellulose derivative and evaporable solvent which solution does not detrimentally affect said layer of nitrocellulose and image, evaporating the solvent, and thereby depositing on the negative, without detrimentally affecting said nitrocellulose layer and image, an adherent stripping film, and then stripping the composite film and negative from the plate.

5. In the photoengraving process employing as a negative a sensitized image-bearing nitrocellulose layer adherent to a support, the method of stripping the negative from the support and comprising applying on the negative a coating of a solution essentially of cellulose derivative and evaporable solvent, which solution does not detrimentally affect the nitrocellulose layer and image, drying the coating to cause it to adhere to the nitrocellulose layer as a tough flexible film and without detrimentally affecting the nitrocellulose layer and image, and then stripping the coating with the nitrocellulose layer adherent thereto from the support.

6. The method of transferring the image-bearing nitrocellulose layer from its original supporting plate to another supporting plate which comprises applying on the image-bearing surface of the nitrocellulose layer a solution essentially of a hydrocarbon soluble cellulose derivative and an evaporable hydrocarbon solvent which does not detrimentally affect the nitrocellulose and image, effecting evaporation of the solvent to dispose the solute as an adherent coating on the said surface of the nitrocellulose layer without deterioration of the nitrocellulose layer and image, then stripping the resultant combination from the original supporting plate and disposing it onto said other plate.

7. In the photoengraving process employing an image-bearing nitrocellulose layer, the method of transferring the image-bearing nitrocellulose layer from a supporting plate which comprises applying directly on the image-bearing surface of the nitrocellulose layer, a solution essentially of translucent cellulose derivative and evaporable hydrocarbon solvent which does not detrimentally affect the nitrocellulose layer and the image, effecting evaporation of the solvent to render the cellulose derivative adherent to the nitrocellulose layer as a substantially uniform coating on the said surface, and then stripping the resultant combination from the plate and transferring the combination to another support.

8. The method of stripping a photographic negative having an underlying image-bearing layer of nitrocellulose which is superimposed upon and adherent to a plate, comprising applying directly on the surface of the image-bearing layer a solution essentially of cellulose derivative and evaporable solvent from the group consisting of ethylene dichloride and xylol, which solution does not detrimentally affect the image-bearing layer and the image, effecting evaporation of the solvent to dispose the cellulose derivative as an adherent coating on the surface of the image-bearing layer without deterioration of the image-bearing layer and image, and then stripping from the original supporting plate the combined solute coating and image-bearing layer.

9. The method of stripping a photographic negative having an underlying image-bearing layer of nitrocellulose which is superimposed upon and adherent to a plate, comprising applying directly on the surface of the image-bearing layer a film forming solution essentially of evaporable solvent, which does not detrimentally affect the image-bearing layer, and cellulose matter from the group consisting of ethyl-cellulose and cellulose aceto-butyrate, depositing on the image-bearing layer by evaporation of the solvent, an adherent translucent film of adequate tensile strength and flexibility to permit handling under the usual conditions of photoengraving work and without detrimentally affecting the image-bearing layer and image, and then stripping from the plate, the combined translucent film and the image-bearing layer.

JOHN M. HAMMOND.